United States Patent
Zax et al.

(10) Patent No.: US 6,962,465 B2
(45) Date of Patent: Nov. 8, 2005

(54) METHOD FOR IMPROVING THE ENVIRONMENT WITHIN SOIL EMBEDDED CULVERT AND BRIDGE SYSTEMS

(75) Inventors: Edward H. Zax, Wilder, KY (US); Scott D. Aston, Cincinnati, OH (US)

(73) Assignee: Con/Span Bridge Systems Ltd, Dayton, OH (US)

( * ) Notice: Subject to any disclaimer, the term of this patent is extended or adjusted under 35 U.S.C. 154(b) by 0 days.

(21) Appl. No.: 11/002,780

(22) Filed: Dec. 2, 2004

(65) Prior Publication Data

US 2005/0123354 A1    Jun. 9, 2005

Related U.S. Application Data

(60) Provisional application No. 60/526,235, filed on Dec. 3, 2003.

(51) Int. Cl.[7] ................................................ E01F 5/00
(52) U.S. Cl. ..................................................... 405/124
(58) Field of Search ................................. 405/124–126

(56) References Cited

U.S. PATENT DOCUMENTS

| | | | |
|---|---|---|---|
| 5,046,893 A | * | 9/1991 | Borgnini ..................... 405/151 |
| 5,326,191 A | * | 7/1994 | Wilson et al. ............... 405/124 |
| 6,338,595 B1 | * | 1/2002 | Schollen ...................... 405/125 |

* cited by examiner

Primary Examiner—Frederick L. Lagman
(74) Attorney, Agent, or Firm—Jacox, Meckstroth & Jenkins

(57) ABSTRACT

The environment and growth of vegetation within a soil embedded culvert system is improved by directing artificial or natural light onto the vegetation within the enclosed passage defined by the culvert system. The light is produced either by internal electrical grow light fixtures or by external sunlight reflectors. A water spray system may also be used within the passage to improve the vegetation growth.

20 Claims, 2 Drawing Sheets

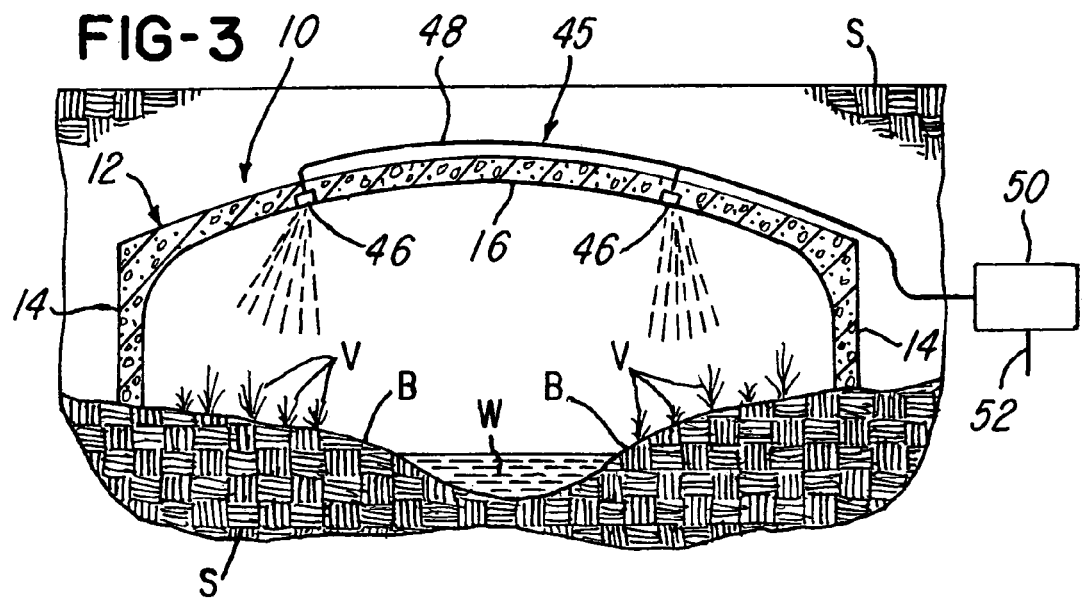
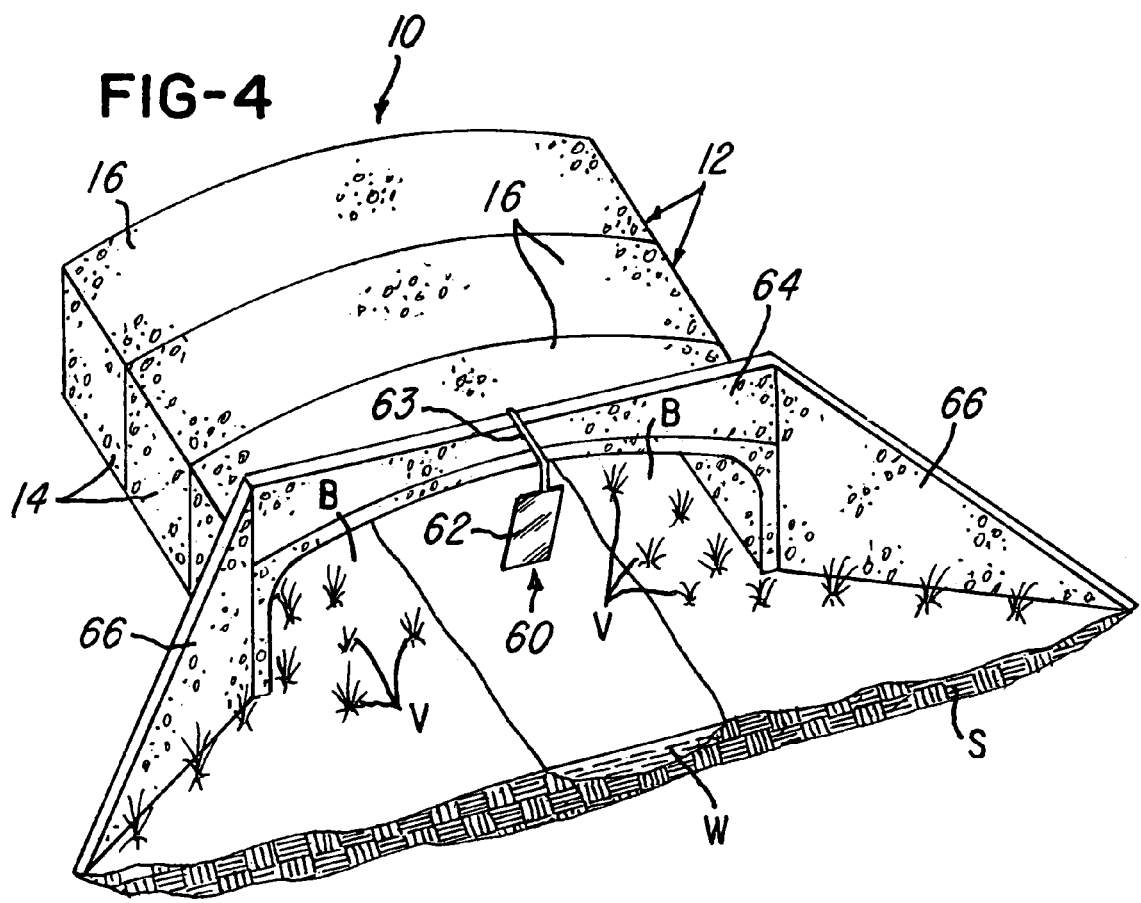

METHOD FOR IMPROVING THE ENVIRONMENT WITHIN SOIL EMBEDDED CULVERT AND BRIDGE SYSTEMS

This application claims the benefit of U.S. Provisional Application No. 60/526,235 filed Dec. 3, 2003.

BACKGROUND OF THE INVENTION

As development across the United States continues to increase, the miles of roadway and number of stream crossings also increase. These roadways and crossings can have a potentially devastating effect on fish and wildlife in the area. Roadways often divide animal habitat, fragmenting populations and impeding migration patterns. While some wildlife passages have been implemented, they are still often inadequate or go unused due to the lack of natural vegetation and darkness in longer underground crossings. These wildlife passages, especially those for large mammals continue to become more important as the number of vehicle-animal incidents continues to increase.

The water stream crossings, which result as part of roadway development, are often inadequate because vegetation on the adjacent stream banks is shaded out and unable to grow. These shaded, barren stream banks no longer provide a habitat for aquatic life and discourage fish from moving upstream. In addition, the absence of vegetation may enhance scour or erosion problems due to the stream.

Thus, a significant limitation in culvert and bridge system design for environmentally sensitive areas is the changing of the natural habitat of streams, adjacent banks, and wildlife corridors. This alteration of the natural habitat can result in the elimination of plant growth and impede the migration of fish and wildlife in the area.

According to the Transportation Research Board (TRB) of the National Cooperative Highway Research Program, Project 25-27, FY 2004, "Every year, the costs of personal injuries and property damage resulting from animal/vehicle collisions are considerable. Various means have been employed to mitigate these collisions, with varying degrees of success. In recent years, highway agencies have placed a growing emphasis on protecting the environment. While many smaller species of animals do not pose a threat to vehicles through collisions, they experience significant habitat loss and fragmentation as a result of roadway alignments. Transportation corridors limit the natural movement of wildlife, affecting individual species and ecosystems."

SUMMARY OF THE INVENTION

The present invention involves the method of using a lighting system and sometimes a watering system within enclosed environmentally sensitive underground culverts and bridges. The systems comprise lighting systems designed to provide natural or artificial light within the bridge or culvert corridor or passage along the length of the passage and may include the distribution of water for environmental and wildlife benefits. The systems described herein may be implemented in conjunction with each other or may be used separately, depending upon environmental needs.

In accordance with preferred embodiments of the invention, the above features and advantages may be provided by installing a series of electrical plant growth lighting fixtures within an underground culvert or bridge assembly along the length of the assembly and by planting vegetation within the earth or soil extending within the passage defined by the culvert or bridge assembly. The lighting fixtures are connected by electrical conductors to a suitable power source which may include rechargeable storage batteries and a solar cell system for charging the batteries. The light generated from the lighting fixtures results in producing growth of the plants or vegetation within the culvert or bridge assembly along its entire length. The invention also provides for a water distribution or spray system along the length of the culvert or bridge assembly from spray nozzles attached to the assembly at spaced intervals along the length of the passage and connecting the spray nozzles by conduits to a suitable water supply source. The invention further provides for directing natural light into the passage defined by the culvert or bridge assembly by the use of natural light reflectors located externally of the assembly.

Other features and advantages of the invention will be apparent from the following description, the accompanying drawings and the appended claims.

BRIEF DESCRIPTION OF THE DRAWINGS

FIG. 3 is a section of a culvert or bridge assembly similar to FIG. 2 and showing a water distribution system along the length of the assembly, in accordance with the invention; and FIG. 4 is a perspective end view of a culvert assembly similar to FIG. 1 and illustrating generally a reflective lighting system for improving plant growth within the culvert assembly in accordance with the invention.

DESCRIPTION OF THE PREFERRED EMBODIMENTS

Figure 1:
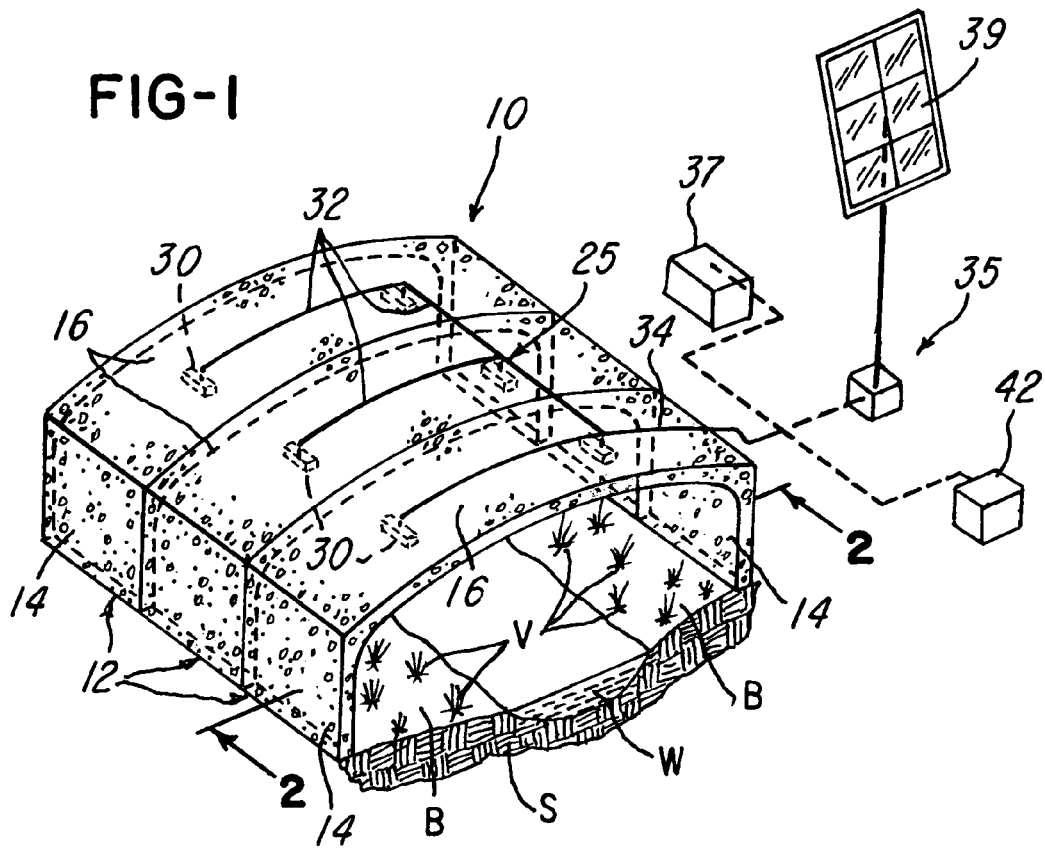
FIG. 1 is a perspective view of an underground culvert or bridge assembly incorporating an internal lighting system along the length of the assembly in accordance with the invention for improving the environment and growth of vegetation within the assembly.

Referring to FIG. 1, an underground culvert or bridge assembly 10 includes a series of precast reinforced concrete culvert or bridge units or sections 12 each of which includes parallel spaced side walls 14 integrally connected by an arch-shaped top wall 16 to form a three sided open bottom section or unit. Each of the culvert or bridge units 12 may be constructed as disclosed in U.S. Pat. No. 4,687,371 which issued to the assignee of the present invention. While three of the precast concrete units 12 are illustrated in FIG. 1, the bridge assembly 10 may include many of the sections 12 and have substantial length, for example, over 50 or 100 feet. The bridge or culvert units 12 may also be constructed with a flat top wall or integrally connected with a bottom wall to form a box-like culvert or bridge assembly. In addition, in place of having a series of precast concrete culvert units which are assembled at the construction site, the culvert or bridge assembly may be constructed as a cast-in-place bridge or culvert or be constructed of metal culvert or bridge sections or units.

Figure 2:
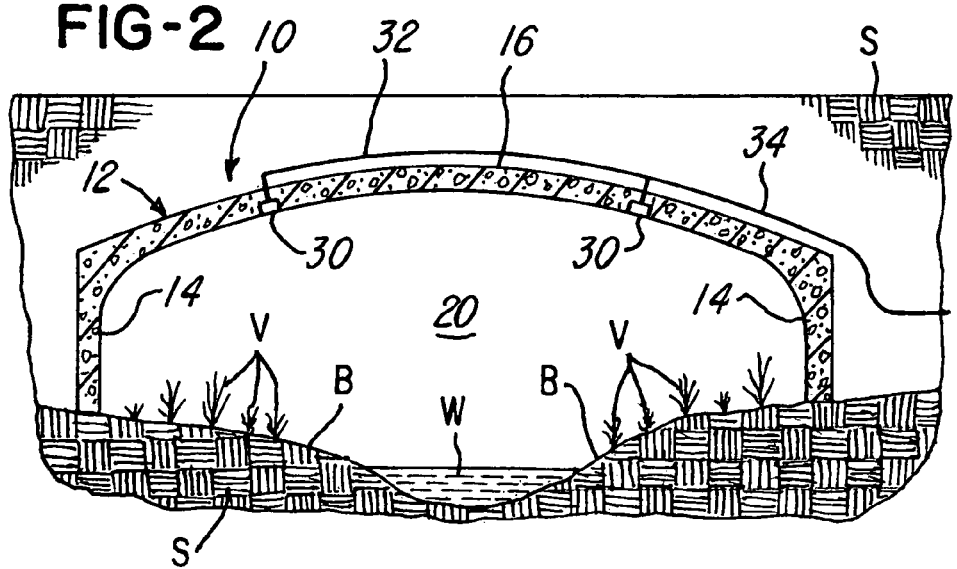
FIG. 2 is a cross-section of the underground culvert or bridge assembly shown in FIG. 1, taken generally on the line 2—2 of FIG. 1.

In accordance with the present invention, the earth or soil S surrounding the culvert or bridge assembly 10 is extended through the passage 20 defined by the assembly, and vegetation V in the form of grass, ground cover or plants is planted along the length of the assembly and within the passage 20. When used as an underground culvert assembly, a stream of water W may also flow through the bottom of the passage 20 between adjacent soil banks B which are planted with the vegetation V. In order to enhance the growth of the vegetation V, a lighting system 25 is installed within the culvert or bridge assembly 10 along the length of the passage 20. As illustrated in FIGS. 1 and 2, the lighting system 25 may include a series of grow light fixtures 30 located at longitudinally spaced intervals along the length of the assembly 10 and passage 20 above the banks B of vegetation V.

The electrical lighting fixtures 30 are connected by electrical conductors 32 and 34 to an electrical power source or supply 35 which may include a rechargeable storage battery 37 recharged by a bank of solar cells 39 or an external electrical power source 42 or a combination. The lighting fixtures 30 are provided with electrical grow light elements which produce growth of the vegetation V along the entire length of the passage 20 formed by the culvert or bridge assembly 10.

Referring to FIG. 3, an elongated culvert or bridge assembly, such as the assembly 10, may also be provided with a water distribution or spray system 45 along the length of the passage 20 as formed by the assembly 10 and above the banks B of vegetation V. Preferably, the watering system 45 includes a series of water spray or misting nozzles 46 which are installed along the length of the assembly 10 either within or on the top wall 16 of each culvert or bridge unit 12. The spray nozzles 46 are connected by a water supply line or conduit 48 to a timer and controller 50 connected to a water supply source or line 52. The water sprays or mists from the nozzles 46 are preferably supplied at timed intervals and also provide for enhancing or promoting growth of the vegetation V within the banks B of soil extending through the culvert or bridge assembly below the top wall.

As illustrated in FIG. 4, the growth of the vegetation V within the banks B along the length of the culvert or bridge assembly 10 may be enhanced or promoted by a natural light reflective system 60 including a plurality of external light reflecting elements 62 located at opposite ends of the culvert assembly and supported by corresponding brackets 63. The elements 62 are positioned to reflect sunlight into the passage 20 along the length of the soil banks B. The reflective elements may be mounted on opposite end walls 64 of the culvert assembly or on wing walls 66 connected to opposite ends of the culvert assembly 10. Since the natural light reflecting elements 62 do not require any electrical power source, the light reflective system 60 eliminates the cost of an electrical power supply.

As mentioned above, the above described lighting and watering systems may be used together or separately, as conditions require. The artificial or natural light, as well as water distribution, within the passage 20 of the bridge or culvert assembly promote native plant or vegetation growth within the soil forming the adjacent stream banks B. By promoting the plant growth in the covered area under the bridge or culvert assembly, the systems reduce or prevent stream scouring or erosion as well as adding habitat area for fish and other animals. The plant growth also encourages fish and wildlife migration through the passage 20. This results in an improved wildlife corridor and maintains the ecology of the area around the culvert.

While the methods and systems herein described constitute preferred embodiments of the invention, it is to be understood that the invention is not limited to the precise methods and systems described, and that changes may be made therein without departing from the scope and spirit of the invention as defined in the appended claims.

What is claimed is:

1. A method of improving the environment and growth of vegetation within a soil embedded elongated culvert system defining a passage adapted for wildlife crossing or a flowing water stream, comprising the steps of extending the soil and vegetation within the passage and along the length of the culvert system, positioning electrical lighting fixtures having light emitting elements within the culvert system along the length thereof, and supplying electrical power to the lighting fixtures for energizing the light emitting elements to produce growth of the vegetation within the passage.

2. A method as defined in claim 1 wherein the culvert system includes a plurality of inverted U-shaped culvert sections in longitudinal alignment to form the passage for the wildlife crossing or the flowing water stream, and including the step of positioning at least one of the lighting fixtures in a top wall of each of the culvert sections.

3. A method as defined in claim 1 wherein the light emitting elements produce substantially natural light.

4. A method as defined in claim 1 and including the step of directing a spray of water onto the vegetation within the passage and along the length of the culvert system.

5. A method as defined in claim 4 and including the step of installing a plurality of longitudinally spaced water spray nozzles within the culvert system, and connecting the water spray nozzles to a controlled water supply.

6. A method as defined in claim 1 wherein the vegetation extends within soil banks extending within the passage along the length of the culvert system and on opposite sides of a flowing water stream.

7. A method as defined in claim 1 wherein the electrical power is supplied from at least one rechargeable battery connected to a solar cell for recharging the battery.

8. A method of improving the environment and growth of vegetation within a soil embedded elongated culvert system defining a passage adapted for wildlife crossing or a flowing water stream, comprising the steps of extending the soil and vegetation within the passage and along the length of the culvert system, positioning at least one light reflector at an end of the culvert system, and positioning the reflector to reflect sun light into the passage and onto the vegetation to produce growth of the vegetation within the passage.

9. A method as defined in claim 8 wherein the culvert system includes a plurality of inverted U-shaped culvert sections in longitudinal alignment to form the passage for the wildlife crossing or the flowing water stream, and including the step of mounting the light reflector on a wall of the culvert system.

10. A method as defined in claim 8 and including the step of directing a spray of water onto the vegetation within the passage and along the length of the culvert system.

11. A method as defined in claim 10 and including the step of installing a plurality of longitudinally spaced water spray nozzles within the culvert system, and connecting the water spray nozzles to a controlled water supply.

12. A method as defined in claim 8 wherein the vegetation extends within soil banks extending within the passage along the length of the culvert system and on opposite sides of a flowing water stream.

13. In a soil embedded elongated culvert assembly defining a passage adapted for wildlife crossing or a flowing water stream, a system for improving the environment and growth of vegetation within soil extending within said passage, said system comprising at least one fixture positioned to direct light into said passage within said culvert assembly along the length of said passage to produce growth of the vegetation within said passage.

14. A system as defined in claim 13 wherein said culvert assembly comprises a plurality of inverted U-shaped culvert sections in longitudinal alignment to form said passage for wildlife crossing or the flowing water stream, and said fixture comprises at least one electrical said lighting fixture supported by a top wall of each of said culvert sections.

15. A system as defined in claim 13 wherein said fixture comprises a light reflecting surface positioned outside of said passage to reflect natural sunlight into said passage.

16. A system as defined in claim 13 in combination with a water spray system positioned to spray water onto the vegetation within said passage and along the length of said passage.

17. A system as defined in claim 16 and including a plurality of longitudinally spaced water spray nozzles within said culvert assembly, and a conduit connecting said nozzles to a controlled water supply.

18. A system as defined in claim 13 wherein the vegetation extends within soil banks extending within said passage along the length of said culvert assembly and on opposite sides of a water stream flowing through said passage.

19. A system as defined in claim 13 wherein said fixture comprises an electrical light fixture, and electrical conductors connecting said fixture to an electrical power supply.

20. A system as defined in claim 19 wherein said electrical power supply comprises at least one rechargeable battery connected to a solar cell for recharging said battery.

* * * * *